United States Patent
Field et al.

(10) Patent No.: US 6,404,885 B1
(45) Date of Patent: Jun. 11, 2002

(54) METHOD AND SYSTEM FOR PROVIDING MULTIPLE CLASSES OF TELEPHONE ACCESS SERVICE

(75) Inventors: Frank A. Field, San Jose, CA (US); Daniel Paul Heyman, Lincroft, NJ (US); R. Craig Hubbard, Wall, NJ (US); Yonatan Aharon Levy, Manalapan, NJ (US); Danielle Liu, Holmdel, NJ (US); Jeffrey J. Polhemus, Freehold, NJ (US); Eberhard F. Wunderlich, Aberdeen, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/303,079

(22) Filed: Apr. 30, 1999

Related U.S. Application Data

(60) Provisional application No. 60/114,533, filed on Dec. 31, 1998.

(51) Int. Cl.[7] .............................. H04M 3/00; H04M 5/00
(52) U.S. Cl. .............................. 379/266.04; 379/265.13; 379/243; 379/201.01
(58) Field of Search ...................... 379/265.01–265.14, 379/266.01–266.1, 201.01–201.03, 242, 243, 244, 245

(56) References Cited

U.S. PATENT DOCUMENTS

| | | | | |
|---|---|---|---|---|
| 4,951,310 A | * | 8/1990 | Honda et al. | 379/266.05 |
| 5,299,259 A | * | 3/1994 | Otto | 379/266.04 |
| 5,590,188 A | * | 12/1996 | Crockett | 379/225 |
| 5,592,542 A | * | 1/1997 | Honda et al. | 379/266.05 |
| 5,828,747 A | * | 10/1998 | Fisher et al. | 379/265.12 |
| 6,285,752 B1 | * | 9/2001 | Rice | 379/266.07 |

* cited by examiner

*Primary Examiner*—Ahmad Matar
*Assistant Examiner*—Benny Q. Tieu

(57) ABSTRACT

A telecommunications method and system for providing and monitoring multiple classes of service to users seeking dial-up access to a given resource. Incoming calls from two user groups, one group subscribing to a first service level and the other group subscribing to a second service level, are initially assigned to open circuits in a first shared dial hunt group. When all circuits are busy, only calls from users subscribing to the second service level are routed to open circuits in a second dedicated dial hunt group so that second level service subscribers will have fewer calls blocked than first level service subscribers. In an alternative implementation, calls from users subscribing to a first service level are routed only to open circuits in a first dial hunt group and calls from users subscribing to a second service level are routed initially to open circuits in a second dial hunt group. When all circuits in the second dial hunt group are busy, calls from second level service subscribers are routed to the first dial hunt group. Service levels are monitored by placing test calls and measuring the number of blocked calls. Hunt group capacities can then be adjusted accordingly.

11 Claims, 4 Drawing Sheets

METHOD AND SYSTEM FOR PROVIDING MULTIPLE CLASSES OF TELEPHONE ACCESS SERVICE

RELATED APPLICATIONS

The present regular utility patent application claims priority to U.S. provisional patent application No. 60/114,533, filed Dec. 31, 1998.

FIELD OF THE INVENTION

The present invention relates generally to the field of telecommunications, and more particularly to a method and system for providing and monitoring multiple classes of service to users seeking dial-up access to a given resource via a dial hunt group.

BACKGROUND OF THE INVENTION

One of the most common and cost effective means for providing consumers, private citizens and business entities alike, with access to certain services, like the Internet, is through the Public Switched Telephone Network (PSTN). For example, users can access the Internet on a personal computer with a modem by dialing a telephone number associated with their Internet service provider. Such "dial-up" access, where many users dial the same telephone number to access the same service, is often provided by means of "dial hunt groups." A dial hunt group is a tool for providing multiple users with simultaneous access to a service via the PSTN. Dial hunt groups and automatic directors for routing calls to different numbers are known in the art and described briefly in U.S. Pat. No. 4,689,815 by Grewal, U.S. Pat. No. 5,515,428 by Sestak, and U.S. Pat. No. 5,825,867 by Epler. These patents are hereby incorporated by reference. In addition to on-line data services like the Internet, other applications for dial hunt groups include facsimile delivery services, automated audio response services for electronic banking, and specialized voice transport such as voice over IP services.

A dial hunt group consists of multiple circuits, with each circuit capable of serving a single dial-in user session. When a user dials the service, he or she is assigned to a particular circuit within the dial hunt group. Subsequent users will be assigned to other circuits. When a user hangs up or is disconnected, the circuit that he or she was using becomes available for another user. When all circuits in the dial hunt group are simultaneously in use, any additional users are prevented from accessing the service via the dial hunt group. These users are said to be "blocked" from accessing the service over the dial hunt group. For example, due to the Internet's increasing popularity, some Internet service providers have had a difficult time keeping up with consumer demand for access. The net result is often a high number of blocked callers. Typically these callers hear a busy signal, although other options, such as announcements informing users about service congestion, are possible.

One measure of the performance of a dial hunt group is "grade of service" (GOS). GOS is a measure, over some time interval, of the percentage of calls that are blocked from accessing the service over the dial hunt group because all circuits in the hunt group are busy.

A service provider employing a dial hunt group may have reason to provide different grades of service to different groups of callers. For example the service provider may charge a higher subscription rate for a higher GOS (i.e., fewer calls blocked). One traditional method to achieve different grades of service is to create separate dial hunt groups for each subscriber group and have members of each group call into their own dial hunt group. However, this approach requires a large number of circuits and, since the cost of providing a service over dial hunt groups is a function of the total number of circuits, it is not very efficient.

Thus, it is desirable to provide a more efficient system and method for implementing and monitoring different levels of dial-up access to a given resource. Such a system would reduce the overall number of required circuits in the hunt groups employed and enable the service provider to monitor and alter the hunt group capacities to ensure that the appropriate class of service is being delivered to its subscribing user group.

SUMMARY OF THE INVENTION

In a preferred embodiment, the invention provides a method for enabling multiple classes of service to users seeking dial-up access to a given resource. The method comprises the steps of: a) providing a first shared dial hunt group accessible by a first user group subscribing to a first service level and a second user group subscribing to a second service level; b) providing a second dedicated dial hunt group accessible only by the second user group subscribing to the second service level; c) identifying incoming calls for either first level service treatment or second level service treatment; d) initially assigning calls from both first level service subscribers and second level service subscribers to circuits in the first dial hunt group; and e) when all circuits in the first dial hunt group are busy, routing new calls from the second level service subscribers to circuits in the second dial hunt group so that second level service subscribers will have fewer calls blocked than first level service subscribers.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
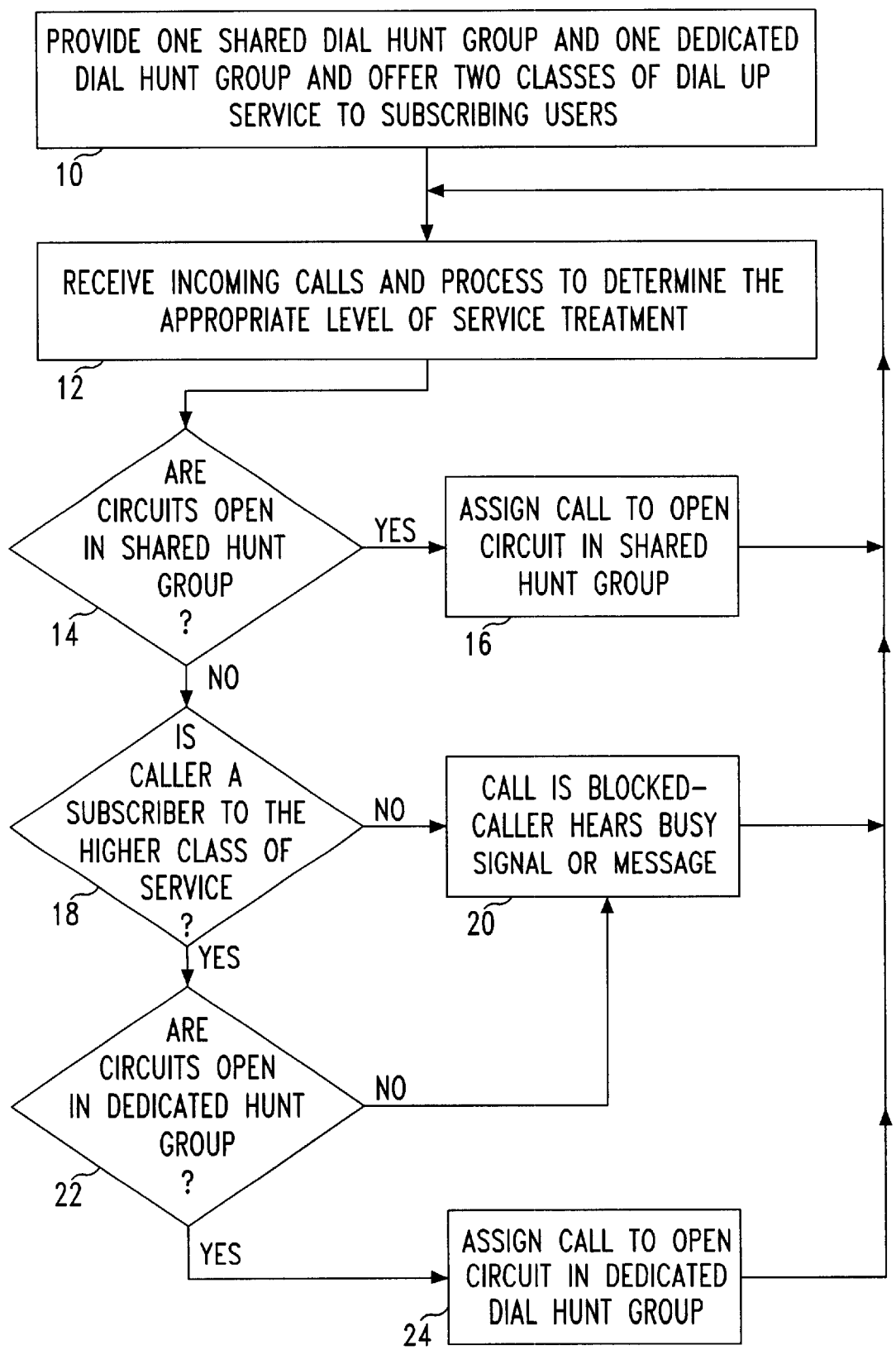
FIG. 1 is a flowchart detailing the steps in a first preferred embodiment of the method of the present invention.

FIG. 1 is a flowchart detailing the steps in a first preferred embodiment of the method of the present invention. In step 10, a service provider offers at least two different classes of service to users seeking access to a dial-up service and provides one shared dial hunt group and one dedicated dial hunt group, corresponding to those two service classes. The shared dial hunt group is accessible by users subscribing to either the first or second service level, while the dedicated dial hunt group is only accessible by users subscribing to the second service level. Calls are received and processed to determine the appropriate level (i.e., first or second) of service treatment in step 12.

Several mechanisms may be employed to identify callers for either first level or second level treatment. The first is based on the number dialed by the caller. In this case, first level callers dial a particular number that causes them to be served only by the shared dial hunt group. Second level callers dial a different number that causes them to be served by either the shared or the dedicated dial hunt group. Alternatively, a caller's originating phone number may also be used to identify him or her for a particular class of service treatment.

There are at least two ways that this call processing and identification step can be implemented using existing technology in the current United States telephone network. The first is through the use of Primary Rate Interfaces (PRI) on local telephone company switches. A PRI consists of 23 circuits and one or more PRIs can be associated with a single trunk group. One or more trunk groups can be associated with a single dial hunt group. Furthermore one or more telephone numbers can be assigned to a hunt group. Finally, telephone switches can be configured such that calls to one telephone number are only routed to circuits within a single dial hunt group, yet calls to another telephone number are first routed to circuits within the same dial hunt group; or if all circuits in that dial hunt group are currently busy, calls can be routed to a second dial hunt group.

A second method for implementing the call processing and identification step is through the use of line side trunk groups with overflow. Here, two dial hunt groups are established, each of which is reachable via a specific telephone number. In addition, the second dial hunt group can be configured to "overflow" to the first dial hunt group when all circuits in the second dial hunt group are in use.

Returning to FIG. 1, in step 14 a test is made to determine if there are circuits open in the shared dial hunt group. If there are circuits available, the call is assigned to an open circuit in the shared hunt group in step 16. If there are no circuits available, a test is made in step 18 to determine if the caller is a second-level service subscriber. (Note: The appropriate level of service treatment was already determined in step 12 via one of the methods discussed above, so the data simply needs to be recalled in step 18.) If the caller is not a second-level subscriber, his or her call is blocked in step 20, and he or she hears a busy signal or message. If, however, the caller is a second-level subscriber, another test is made in step 22 to determine if there are open circuits in the dedicated dial hunt group. If there are circuits available, in step 24 the call is assigned to an open circuit in the dedicated dial hunt group. If there are no available circuits, the call is blocked in step 20, even though the caller subscribes to the higher level of service. After each call is disposed of, either through a connection to one of the available circuits or a blockage, the next call is received and processed following the same steps, beginning with step 12.

The present approach allows for differentiation of service classes at a reduced cost by reducing the number of circuits needed. In particular, the dedicated dial hunt group need not be sized to handle the normal expected traffic from the higher service class, but only the overflow from the shared dial hunt group.

Since service providers who wish to provide different classes of service to different caller groups must monitor the dial hunt groups to ensure that enough circuits are available given the calling volume, the calls received and processed in step 12 can include test calls, generated by the service provider, that simulate usage by members of each user group. Given an appropriate sampling rate, the service provider can then obtain a good estimate of the Grade of Service (GOS) being provided to each group of callers by recording the percentage of test calls that are blocked. Such data is usually not available, because it is not possible to directly measure the total number of call attempts to the dial hunt groups.

Figure 2:
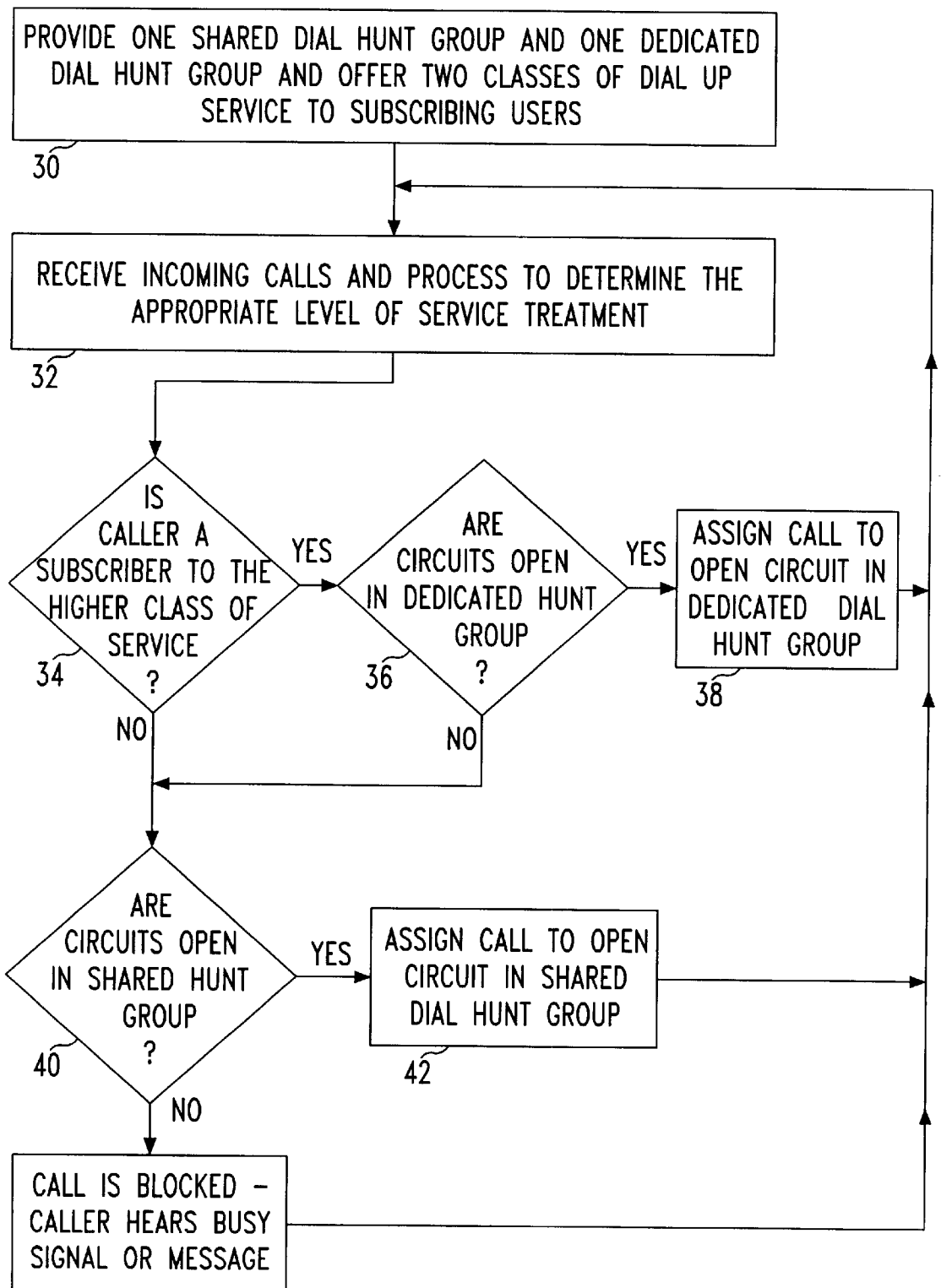
FIG. 2 is a flowchart detailing the steps in another preferred embodiment of the method of the present invention.

Reference is now made to FIG. 2, which is a flowchart detailing the steps of another preferred embodiment of the method of the present invention. In step 30, a service provider offers at least two different classes of service to users seeking access to a dial-up service and again provides one shared dial hunt group and one dedicated dial hunt group, corresponding to those two service classes. As in FIG. 1, The shared dial hunt group is accessible by users subscribing to either the first or second service level, while the dedicated dial hunt group is only accessible by users subscribing to the second service level. Calls are received and processed to determine the appropriate level (i.e. high or low) of service treatment in step 32.

In step 34, a test is made to determine if the caller subscribes to the second service level. If the caller does subscribe to the second service level, a second test is made in step 36 to determine if there are open circuits in the dedicated dial hunt group. If there are circuits available, the call is assigned to an open circuit in the dedicated hunt group in step 38. If there are no dedicated hunt group circuits available, another test is made in step 40 to determine if there are open circuits in the shared hunt group. If there are shared hunt group circuits available, the call is assigned to an open circuit in the shared group in step 42. If, however, there are no shared hunt group circuits available, the call is blocked in step 44, and the user hears a busy signal or message.

Returning to step 34, if, however, the user is a first-level subscriber, a test is made in step 40 to determine if there are circuits open in the shared hunt group. If there are circuits available, the call is assigned to the shared hunt group in step 42; if not, the call is blocked in step 44. Therefore, in this embodiment, provided that circuits are open in both the shared and dedicated hunt groups, incoming calls from second-level service subscribers are initially assigned to open circuits in the dedicated dial hunt group, while calls from first-level service subscribers are assigned to open circuits in the shared dial hunt group. Once the dedicated hunt group has reached capacity, new calls from second-level subscribers "overflow" into the shared dial hunt group, provided circuits are available.

Figure 3:
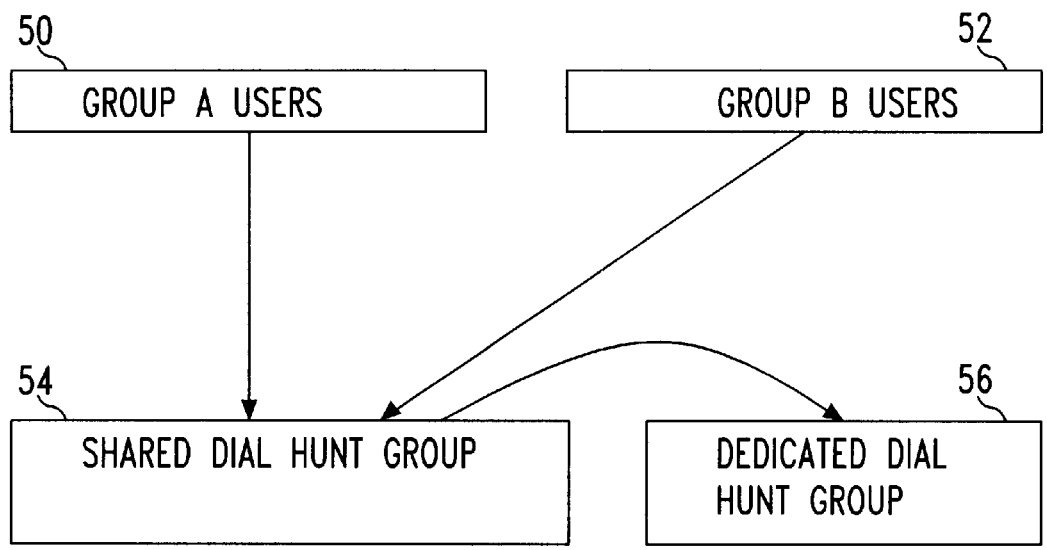
FIG. 3 is a schematic diagram illustrating the method of FIG. 1.

Reference is now made to FIG. 3, which is a schematic diagram illustrating the method detailed in FIG. 1. It depicts the case of a service provider wanting to provide different classes of service to two groups of callers, a group A 50, consisting of users subscribing to a first service level, and a group B 52, consisting of users subscribing to a second service level. The service provider establishes two dial hunt groups. The first of these hunt groups 54 is shared among members of both groups of callers. The second dial hunt group 56 is only available to users of one group, say group B. As callers access the service, they are initially assigned to the shared dial hunt group 54. When all circuits in the shared hunt group 54 are in use, additional callers in group A 50 will be blocked. However additional callers in group B 52 will be served over circuits in the dedicated dial hunt group 56. Given things such as the number of callers in each group, the frequency with which they call, and the duration of their calls, it is possible to configure the sizes of the dial hunt groups such that callers in group B will have a lower percent of calls blocked than those in group A. Put another way, the members of group B will have a higher grade of service than those of group A. Furthermore, if there are differences in the calling characteristics of the two groups (say the maximum number of simultaneous callers in one group occurs at a different time of day than another group), then additional economies can be achieved while at the same time ensuring the desired performance levels.

Figure 4:
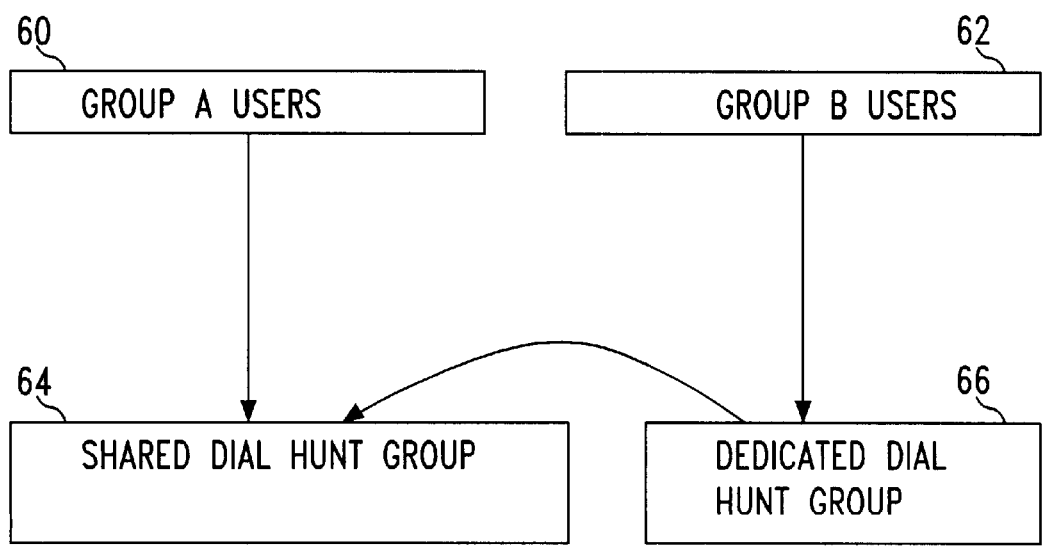
FIG. 4 is a schematic diagram illustrating the method of FIG. 2.

Reference is now made to FIG. 4, which is a schematic diagram illustrating the method detailed in FIG. 2. As in FIG. 3, FIG. 4 depicts a method employed by a service provider who wishes to provide different classes of service to two user groups, group A 60 and group B 62. In this variation, if the number of callers in group B 62 is small in relation to the number of callers in group A 60, with all other things being equal, different classes of service can be delivered if group B callers, who subscribe to the higher level of service, are first directed to the dedicated dial hunt group 66. Only when all circuits in the dedicated hunt group 66 are in use are group B calls directed to the shared dial hunt group 64.

Figure 5:
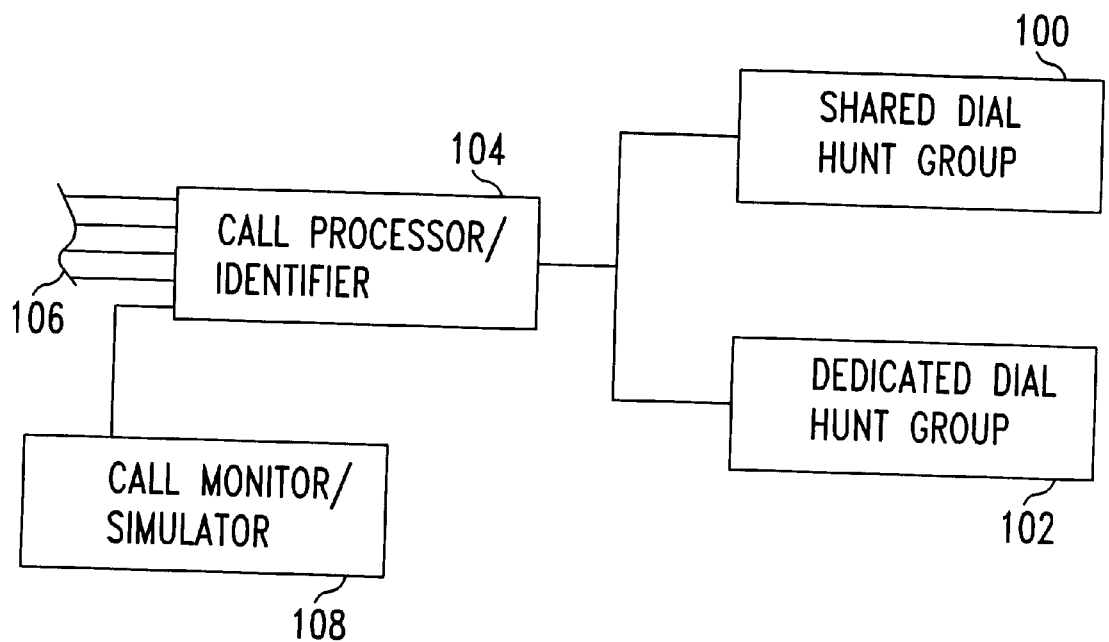
FIG. 5 is a schematic diagram of a preferred embodiment of the telecommunications system of the present invention.

Reference is now made to FIG. 5, which is a schematic diagram of a preferred embodiment of a telecommunications system of the present invention. A shared dial hunt group 100 and a dedicated dial hunt group 102 are provided. These two hunt groups correspond to a two-tier service system. The shared hunt group 100 is accessible by users subscribing to either a first service level or a second service level. The dedicated dial hunt group 102 is accessible only by the group of second-level subscribers. Calls are routed to the hunt groups by a call processor/identifier 104, which receives incoming calls from input lines 106, determines the appropriate level of service treatment for these calls, and distributes calls accordingly between the two dial hunt groups 100 and 102. In one implementation, calls from subscribers to both service levels are initially assigned by call processor/identifier 104 to open circuits in shared hunt group 100. When all circuits in the shared hunt group 100 are busy, new calls from second-level service subscribers are routed by call processor/identifier 104 to open circuits in the dedicated dial hunt group 102, while new calls from first-level subscribers are blocked. This results in fewer calls blocked for second-level service subscribers.

In an alternate implementation, calls from second-level service subscribers are initially assigned by call processor/identifier 104 to circuits in dedicated dial hunt group 102, while calls from first level subscribers are only assigned to shared hunt group 100. When all circuits in the dedicated hunt group 102 are busy, new calls from second-level service subscribers are routed by call processor/identifier 104 to open circuits in the shared dial hunt group 100. Again, the net result is fewer calls blocked for second level service subscribers.

In either variation, a call monitor/simulator 108 may be provided to generate test calls to simulate usage by both first level and second level service subscribers and to measure the percentage of test calls that are blocked. A service provider can then adjust the hunt group capacities to meet the desired level of service.

What is claimed is:

1. A method for providing multiple levels of telephone access service to a given resource comprising the steps of:
   a) providing a first shared dial hunt group accessible by a first user group subscribing to a first service level and a second user group subscribing to a second service level;
   b) providing a second dedicated dial hunt group accessible only by said second user group subscribing to said second service level;
   c) identifying incoming calls for either first level service treatment or second level service treatment;
   d) initially assigning calls from both first level service subscribers and second level service subscribers to circuits in said first dial hunt group; and
   e) when all circuits in said first dial hunt group are busy, routing new calls from said second level service subscribers to circuits in said second dial hunt group so that second level service subscribers will have fewer calls blocked than first level service subscribers.

2. The method of claim 1 further comprising the step of:
   (f) monitoring both of said dial hunt groups to ensure that enough circuits are available given the calling volume and that an appropriate level of service is being provided to each of said subscriber groups.

3. The method of claim 2 wherein said monitoring is accomplished by placing test calls to simulate usage by both said first level service subscribers and said second level service subscribers and measuring the percentage of said test calls that are blocked.

4. The method of claim 1 wherein said step of identifying incoming calls for service treatment is accomplished by providing first level service subscribers with a first dial-up access number that can only be served by said first dial hunt group, while providing said second level service subscribers with a second dial-up access number that can be served by either said first dial hunt group or said second dial hunt group.

5. The method of claim 1 wherein said step of identifying incoming calls for service treatment is based on a caller's originating phone number.

6. A telecommunications system for providing multiple classes of service to users seeking dial-up access to a given resource comprising:
   a) a first shared dial hunt group accessible by a first user group subscribing to a first service level and a second user group subscribing to a second service level;
   b) a second dedicated dial hunt group accessible only by said second user group subscribing to said second service level; and
   c) a call processor/identifier for determining a service treatment level for incoming calls and for distributing said calls between said dial hunt groups;
   wherein calls from both said first level service subscribers and said second level service subscribers are initially assigned by said call processor to circuits in said first dial hunt group, and when all circuits in said first dial hunt group are busy, new calls from said second level service subscribers are routed by said call processor to circuits in said second dial hunt group so that second level service subscribers will have fewer calls blocked than first level service subscribers.

7. The telecommunications system of claim 6 further comprising:
   e) a call monitor/simulator for placing test calls to simulate usage by both said first level service subscribers and said second level service subscribers and for measuring the percentage of said test calls that are blocked.

8. A method for providing multiple levels of telephone access (dial up) service to a given resource comprising:
   a) providing a first shared dial hunt group accessible by a first user group subscribing to a first service level and a second user group subscribing to a second service level;
   b) providing a second dedicated dial hunt group accessible only by said second user group subscribing to said second service level;

c) identifying incoming calls for either first level service treatment or second level service treatment;

d) initially assigning calls from said first level service subscribers to circuits in said first dial hunt group and calls from said second level service subscribers to circuits in said second dial hunt group; and e) when all circuits in said second dial hunt group are busy, routing new calls from said second level service subscribers to circuits in said first dial hunt group so that second level service subscribers will have fewer calls blocked than first level service subscribers.

9. A telecommunications system for providing multiple classes of service to users seeking dial-up access to a given resource comprising:

a) a first shared dial hunt group accessible by a first user group subscribing to a first service level and a second user group subscribing to a second service level;

b) a second dedicated dial hunt group accessible only by said second user group subscribing to said second service level; and c) a call processor/identifier for determining the service treatment level for incoming calls and for distributing said calls between said dial hunt groups wherein calls from said first level service subscribers are only assigned to circuits in said first dial hunt group and calls from said second level service subscribers are initially assigned to circuits in said second dial hunt group, and when all circuits in said second dial hunt group are busy, new calls from said second level service subscribers are routed by said call processor to circuits in said first dial hunt group so that second level service subscribers will have fewer calls blocked than first level service subscribers.

10. The telecommunications system of claim 9 further comprising:

e) a call monitor/simulator for placing test calls to simulate usage by both said first level service subscribers and said second level service subscribers and for measuring the percentage of said test calls that are blocked.

11. A method for providing multiple classes of service to users seeking dial-up access to a given resource comprising:

a) offering N different classes of service to subscribing users, where N is greater than or equal to two, with the Nth class of service being the highest class of service;

b) providing (N−1) shared dial hunt groups, where the nth hunt group ($1 \leq n \leq (N-1)$) is accessible by all users subscribing to a service class x, where $n \leq x \leq N$;

c) providing one dedicated dial hunt group accessible only by users subscribing to said highest service class N;

d) identifying incoming calls for appropriate class of service treatment;

e) initially assigning calls from users subscribing to the nth class of service to available circuits in the lowest numbered hunt group y, where $1 \leq y \leq n$; and f) when all circuits in said dial hunt group y are busy, routing new calls from said users subscribing to the nth class of service to available circuits in the next highest numbered hunt group, y+1, where $2 \leq (y+1) \leq n$, so that higher level service subscribers will have fewer calls blocked than lower level service subscribers.

* * * * *